Jan. 27, 1942.   G. T. LAMPTON   2,271,435
CONTROLLABLE PITCH PROPELLER
Filed Jan. 26, 1939   3 Sheets-Sheet 1
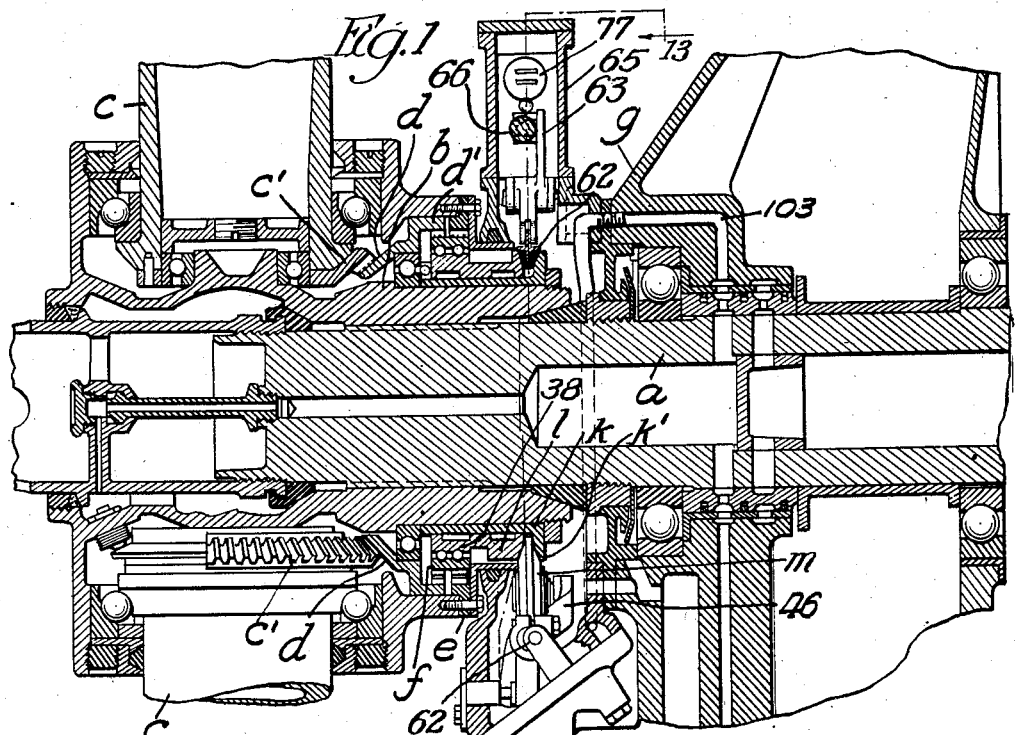
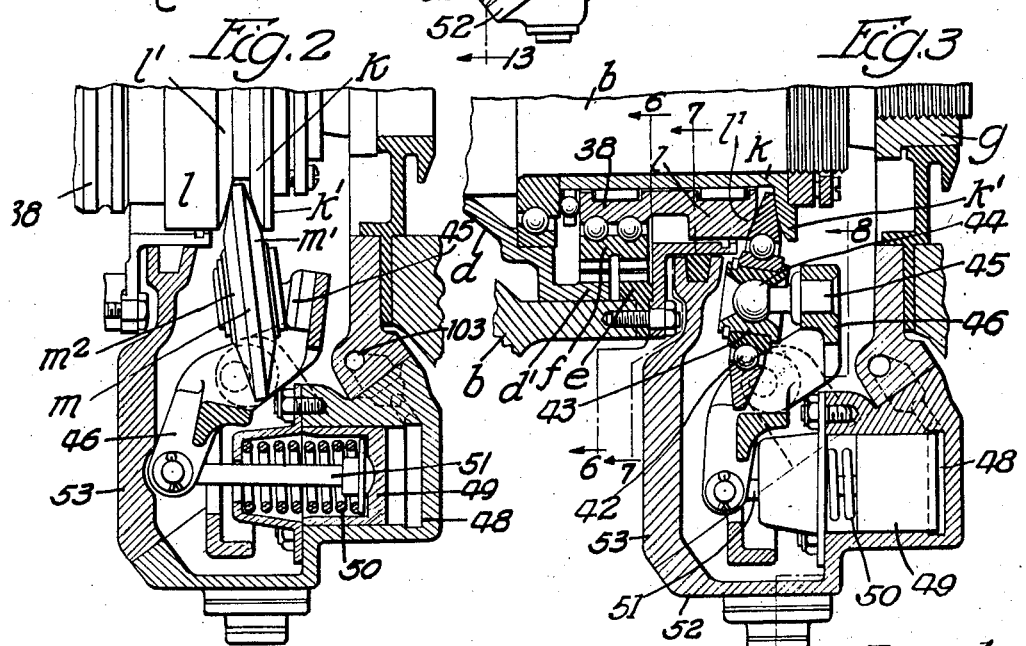

Jan. 27, 1942.    G. T. LAMPTON    2,271,435
CONTROLLABLE PITCH PROPELLER
Filed Jan. 26, 1939    3 Sheets-Sheet 2
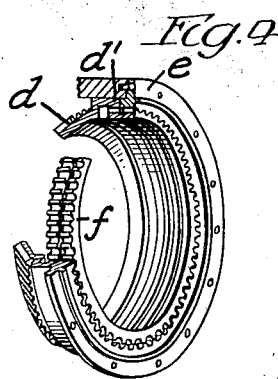
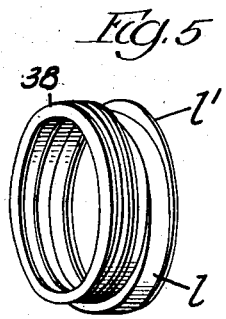
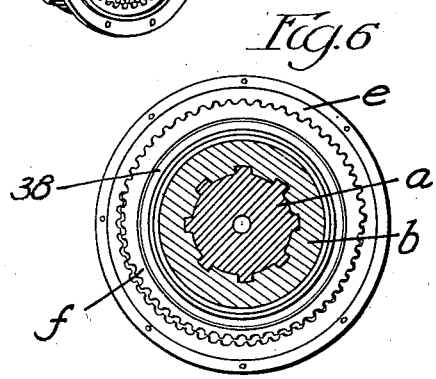
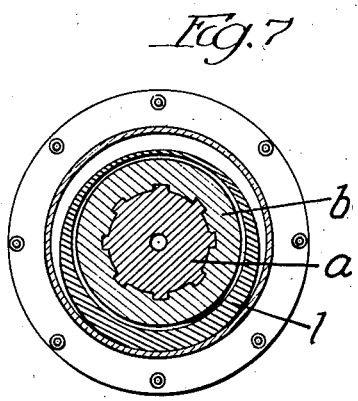
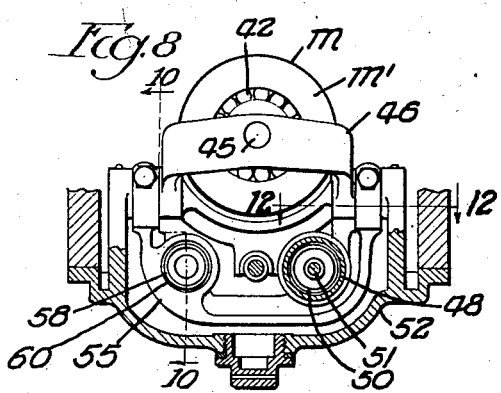
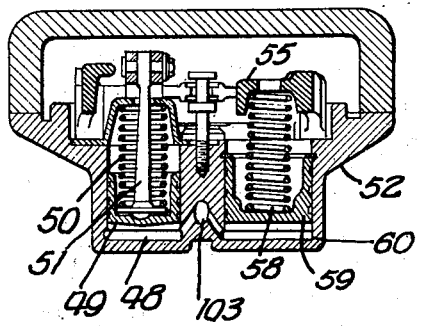
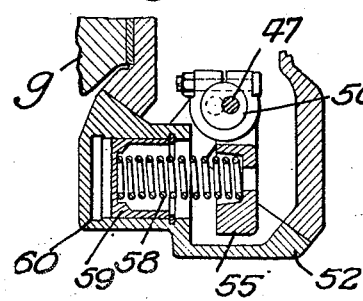
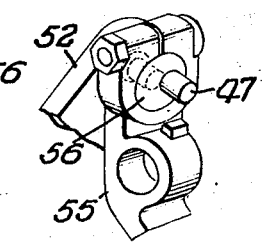
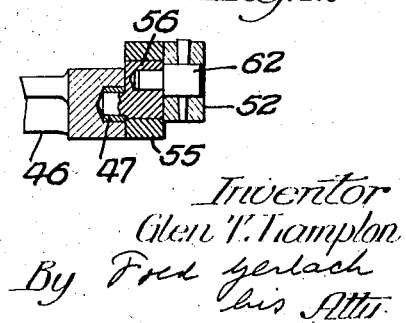
Inventor
Glen T. Lampton
By Fred Gerlach
his Atty

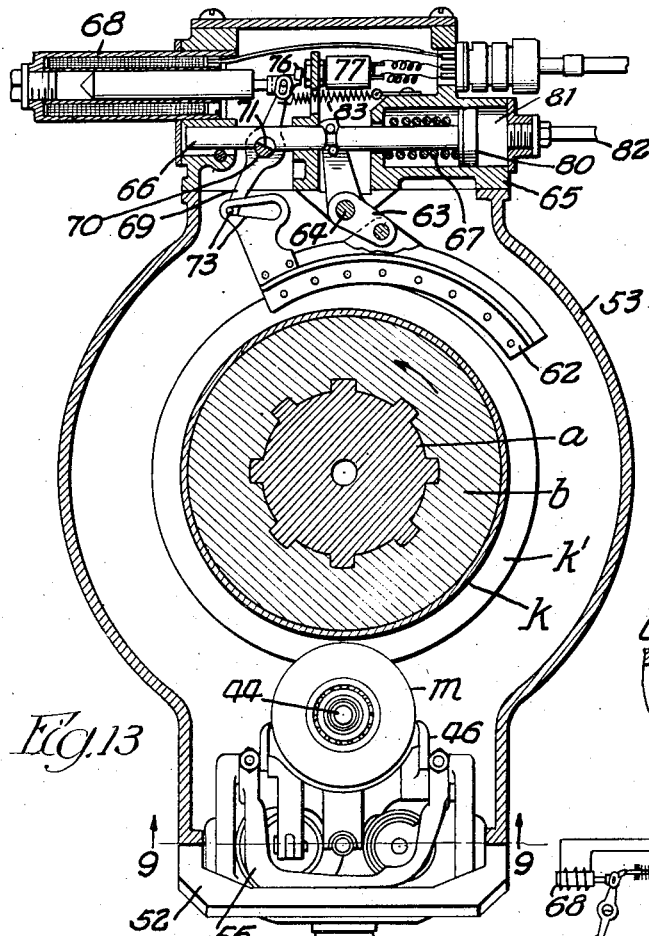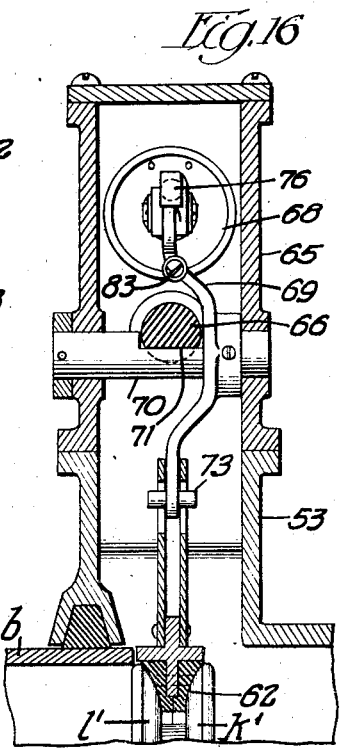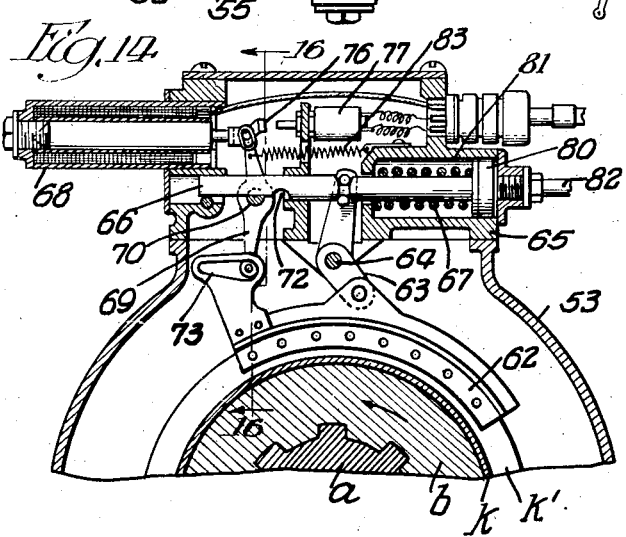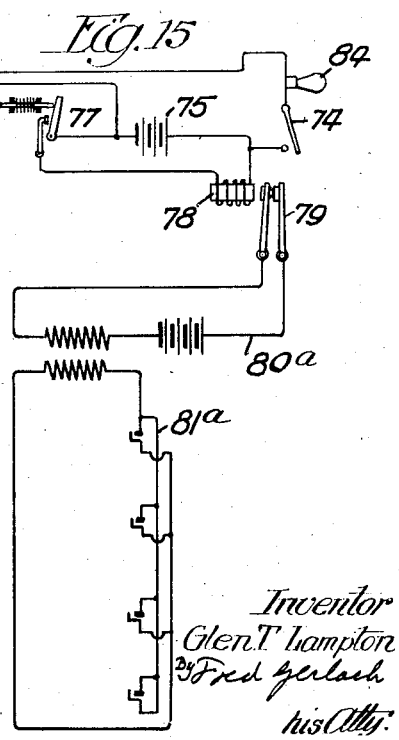

Patented Jan. 27, 1942

2,271,435

UNITED STATES PATENT OFFICE 2,271,435

CONTROLLABLE PITCH PROPELLER

Glen T. Lampton, Williamsport, Pa., assignor to Aviation Manufacturing Corporation, New York, N. Y.

Application January 26, 1939, Serial No. 252,877
In Great Britain January 27, 1938

10 Claims. (Cl. 170—163)

This invention relates to controllable pitch propellers for aircraft.

One object of the invention is to provide improved means for operating the pitch-change mechanism to feather the propeller blades at a higher rate of speed than is employed to effect adjustment of the blades in the normal flying range.

In the operation of aircraft equipped with controllable pitch propellers it is, in emergencies, necessary to quickly "feather" the propeller blades of one or more engines, in such a manner as to set the chord of the propeller blade section parallel with the line of flight of the aircraft. Such occasions arise when a power plant fails and rotation of its propeller due to windmilling would cause damage to its component parts. In the event of such engine failure, it is desirable to reduce the drag of the inoperative power plant by moving the blades of that propeller to a fore-and-aft position in which their resistance to air flow is at a minimum. Since the contingency of engine failure is particularly critical in operating the aircraft during landing and take-off, it is desirable that the mechanism provided for feathering the propellers be able to do so at a higher speed rate than is normally provided for varying the blade angles between their high and low flying positions.

A further object of the invention is to provide means in conjunction with the pitch-change mechanism of a controllable aircraft propeller for simultaneously feathering the blades and imposing a braking effort on the rotation of the propeller in the event of failure of the engine on which the propeller is operating.

Other objects of the invention will appear from the following description.

The invention consists in the several novel features hereinafter set forth and more particularly defined by the claims at the conclusion hereof.

In the drawings: Fig. 1 is a longitudinal section of a propeller in which the invention is incorporated. Fig. 2 is a longitudinal section (parts in elevation) of the friction drive mechanism for the pitch change gearing set for decreasing the pitch of the blades. Fig. 3 is a similar section with the friction drive mechanism set for pitch increase. Fig. 4 is a sectional perspective of the gear rings around the propeller shaft. Fig. 5 is a perspective of the driven friction element. Fig. 6 is a section on line 6—6 of Fig. 3. Fig. 7 is a section on line 7—7 of Fig. 3. Fig. 8 is a section on line 8—8 of Fig. 3. Fig. 9 is a section on line 9—9 of Fig. 13. Fig. 10 is a section on line 10—10 of Fig. 8. Fig. 11 is a perspective of the pivotal mounting for the pulley shifter yoke. Fig. 12 is a section on line 12—12 of Fig. 8. Fig. 13 is a section on line 13—13 of Fig. 1. Fig. 14 is a section of the feathering mechanism in its operative position. Fig. 15 is a diagram of the electrical connections for the feathering mechanism. Fig. 16 is a section on line 16—16 of Fig. 14.

The controllable propeller with which this invention is embodied comprises a hub $b$ keyed to engine driven shaft $a$ which is journaled in a stationary gear housing $g$. A bevel gear segment $c^1$ is fixed to each propeller blade $c$, and a gear ring $d$, rotatable in hub $b$, meshes with segments $c^1$ and equidistantly rotates them for pitch variation of the blades. A gear ring $e$, fixed to the hub $b$, has internal gear teeth. An eccentric ring $f$ has two series of external gear teeth, which mesh respectively with the teeth on gear rings $d$ and $e$. The teeth on ring $f$ are at least one less in number than those on rings $d$ and $e$. Ring $f$ is journaled on eccentric 38 which is integral with element $l$. Each revolution of the eccentric 38 rolls ring $f$ in fixed ring $e$, rotates ring $f$ and ring $d$ relatively to the hub, and rotates ring $e$ in the direction of rotation of ring $f$, an angular distance corresponding to one tooth on ring $f$.

Friction driving element $k$ is fixed on hub $b$ to rotate with shaft $a$ and has an annular convex driving face $k^1$. Complementary friction element $l$, rotatable around the hub of element $k$, has an annular convex friction face $l^1$ opposite $k^1$. An angularly adjustable friction pulley $m$ has convergent conoidal faces $m^1$ and $m^2$ engaging friction faces $k^1$, $l^1$, respectively. Angular adjustment of pulley $m$ relatively varies the radii of the contacts between the faces $m^1$ and $m^2$, and friction faces $k^1$, $l^1$ to rotate element $l$ in hub $b$ in opposite directions relatively to element $k$. Element $l$ is integral with eccentric 38 on which gear ring $f$ is journaled. Rotation of eccentric 38 with element $l$ and the engagement of ring $f$ with gear ring $e$, which is fixed to hub $b$, imparts an epicycloidal movement to ring $d^1$, which moves ring $d^1$ relatively to ring $e$ an angular distance corresponding to the difference in number of teeth on rings $f$ and $e$ which drives gear ring $d$ a corresponding angular distance in hub $b$ to rotate the gear segments on the blades.

The pulley $m$ engages the friction faces $k^1$, $l^1$ on equal radii when its axis is parallel to the axis of the shaft $a$, and rotates idly without producing relative rotation between these elements, so that eccentric 38 and rings $d$, $e$, and $f$ will not rotate in hub $b$. When the pulley is in the angular position shown in Fig. 2, the driving ratios between face $k^1$ and $m^1$, and between face $m^2$ and face $l^1$, will both be increased, and element $l$ will be driven to rotate eccentric 38 in one direction relatively to the shaft $a$ and operate eccentric ring $f$ to drive gear $d$ in the direction which will decrease the blade pitch. When the pulley $m$ is set in the oppositely inclined position as shown in Fig. 3, the driving ratios between face $k^1$ and $m^1$, and between $m^2$ and $l^1$ will both be reduced and element $l$ will rotate eccentric 38 in the opposite direction around shaft $a$ to rotate gear ring $d$ and drive gear ring $d$ to increase the blade pitch.

Pulley $m$ is journaled to rotate around hub 43 on ball bearing 42. Hub 43 is supported by stud 45 and a ball-and-socket joint 44 between the stud and the hub, which permits the pulley to be set in different angular positions by movement of the stud transversely to the pulley, the faces $m^1$, $m^2$ of the pulley being confined between the friction faces of the elements $k$ and $l$. Stud 45 is fixed to yoke 46 pivoted on coaxial pintles 47. Yoke 46 is adapted to shift stud 45 and hub 43 and pulley $m$ through joint 44. Yoke 46 is shiftable by fluid pressure in cylinder 48, which operates piston 49 loaded by spring 50 and shift yoke 46 through rod 51. Normal pressure in cylinder 48 is maintained to shift piston 49 to hold pulley $m$ in its neutral position. An increase of pressure above normal in cylinder 48 operates piston 49 to shift pulley $m$ to its pitch decreasing position (Fig. 2). Spring 50 shifts yoke 46 into position to shift pulley $m$ into pitch increasing position (Fig. 3) when the pressure is decreased below normal. Fluid, usually oil, under controlled pressure is applied to cylinder 48 through a duct 103. Any suitable manual or automatic means may be employed for controlling the oil pressure in the line 103 to cylinder 48. Pintles 47 for yoke 46 are carried by eccentrics 56 which are pivotally supported on pins 62, fixed in lugs on head 52. A yoke 55 is clamped to eccentrics 56 and spring 58 is adapted to shift yoke 55 to rock eccentrics 56 and move pintles 47 for yoke 46 toward friction faces $k^1$, $l^1$ to force pulley $m$ into driving contact with both of said faces. Spring 58 is engaged by a piston 59 in cylinder 60 in which the same pressure as that in cylinder 48 is maintained. The inward movement of piston 59 is arrested by a fixed stop in cylinder 60. When the pressure in the oil line and cylinder 60 falls below the low degree required for shifting the pulley $m$ to pitch increasing position, piston 50 will move outwardly in cylinder 60 and unload the pressure of spring 58 from yoke 55 so that pulley $m$ will not be pressed into contact with the faces $k^1$, $l^1$. Any suitable means may be used for controlling the pressure of fluid in cylinders 48 and 60, as well understood in the art.

This invention comprises a device for quickly feathering the blades to prevent the propeller from wind-milling or offering head resistance when one engine of a multi-engined airplane is cut off for fuel economy, or in the event of engine breakage or failure. This device comprises a lever 63 (Figs. 13 and 14), fulcrumed at 64 in a casing 65 which is fixed to casing 53; a brake shoe 62 provided with faces for engaging friction faces $k^1$, $l^1$; a plunger 66 slidably mounted in head 65 and operable by spring 67 to shift brake shoe 62 into engagement with the friction elements $k$, $l$; a lever 69 fixed to a cross shaft 70 pivoted in casing 65, and connected to brake shoe 62 by a pin and slot 73; and a solenoid magnet 68 which has an armature which is connected to rock lever 69; and shaft 70 to latch plunger 66 in position to hold the brake shoe disengaged from the friction elements until the solenoid is energized. Shaft 70 is provided with a cut-out portion or recess 71 adapted to rotate into a semi-cylindrical notch 72 in plunger 66 to latch the plunger 66 in its brake-releasing position. Shaft 70 is rotated by lever 69 when the magnet is energized, to pass out of notch 72 and release the plunger 66 for sliding movement so that spring 67 will shift plunger 66 to operate lever 63 to apply the brake. The lower end of the lever 69 moves in slot 73 which, with the pivotal connection between the brake shoe and lever 63, controls the path of movement of the brake shoe so the latter will be applied concentrically to friction elements $k$ and $l$. A switch 74 is located in the pilot's cockpit and controls a circuit from battery 75 through magnet 68 so that the pilot may, at any time, energize said magnet to release the plunger 66 and apply brake shoe 62. When brake shoe 62 is applied to friction faces $l^1$, $k^1$, the brake shoe will first retard the friction member $l$ to operate the pitch change gearing to set the blades in feathered position. Positive stop mechanism is usually provided between the propeller blades and the hub to limit the pitch increase, at the point where the blades extend fore-and-aft, as well understood in the art. After the blades have been thus shifted and arrested, brake 62 becomes effective on element $k$ to retard the engine shaft $a$.

In the event of failure of the motor or when it is desired to cut out one engine of a multi-motored plane, it is also desirable to interrupt the ignition-circuit of the internal combustion engine. For this purpose lever 69 is provided with an abutment 76 to control a normally open switch 77 in a circuit including the armature of a magnet 78 which is adapted to open a switch 79 in the primary ignition circuit 80$a$. The spark plugs $x$ are included in the secondary ignition circuit 81$a$. As the result, when the pilot closes switch 74 to apply brake 62, lever 69 will release and close switch 77 to close the circuit to energize armature 78 and open switch 79 to open the ignition circuit.

Plunger 66 is fixed to a piston 80 which is slidable in a cylinder 81. Pipe 82 for fluid, such as oil under pressure, is connected to cylinder 81 and may be controlled by a valve within reach of the pilot. When oil is supplied to the cylinder 81, piston 80 will shift plunger 66 to release the brake 62 and open switch 77 to de-energize the magnet 78 and close switch 79 and the ignition circuit. A spring 83 will then rock lever 69 and shaft 70 to latch plunger 66 to hold the brake in the released position. A signal lamp 84 is included in the circuit controlled by solenoid 68, so that the pilot will know when the brake is set.

The invention exemplifies means cooperating with the pitch-change gearing in controllable propellers for aircraft, which actuates the propeller blades practically instantaneously to a position in which their chord is parallel to the line of flight of the aircraft. It further exemplifies means for simultaneously imparting a braking effort on the power plant to arrest its rotation, and means for opening the ignition circuit of the power plant to render it inoperative when the feathering and braking mechanism is rendered operative. It also exemplifies means for re-establishing the ignition-circuit and resetting the brake actuating mechanism when it is desired to have the power plant and propeller function in their normal manner.

The invention is not be understood as restricted to the details set forth herein, since these may be modified within the scope of the appended claims, without departing from the spirit and scope of the invention.

Having thus described the invention, what I claim as new and desire to secure by Letters Patent is:

1. In a controllable pitch propeller, the combination with an engine-driven shaft, of variable pitch blades, mechanism for rotating the blades for pitch variation comprising a friction driving element fixed to rotate with said shaft, a friction driven element rotatable on said shaft, variable means for operating the driven element from the driving element for rotating the blades for increasing and decreasing the pitch at a relatively low speed, and a brake engageable with both of said elements for actuating the driven element to shift the blades to feathered position at a higher speed than the driven element is driven by the variable operating means and to retard the driving element.

2. In a controllable pitch-propeller, the combination with an engine driven shaft of blades rotatable for pitch-variation, mechanism for shifting the blades for pitch-variation, comprising friction driving and driven elements on the shaft, variable means for operating one of the elements from the other to rotate the blades at a relatively low speed to increase and decrease the pitch, and a brake engageable with the driven element to rotate the blades at a relatively higher speed to feathered position than the driven element is driven by the operating means and engageable with the driving element to retard the shaft.

3. The combination with an engine-driven propeller comprising blades rotatable for pitch-variation, mechanism for rotating the blades at a relatively low speed for pitch-changes, mechanism for rotating the blades at a relatively higher speed, and electro-magnetic means for automatically rendering the ignition means for the engine inoperative to stop the engine when the mechanism for operating the blades at the higher speed is actuated.

4. The combination with an engine-driven propeller comprising blades rotatable for pitch-variation, variable mechanism for shifting the blades at a relatively low speed for increasing and decreasing the pitch, a spring actuated brake for shifting the blades at a relatively higher speed than that which they are shifted by the variable mechanism, and electro-magnetic means for controlling the spring application of the brake.

5. The combination with an engine-driven shaft of a propeller comprising blades rotatable for pitch-variation, mechanism for rotating the blades at a relatively low speed for pitch-changes, means for shifting the blades at a high speed to their feathered position, means for rendering the ignition means for the engine inoperative, and means for conjointly controlling the operation of the high speed shifting means for the blades and the said means for rendering the ignition means inoperative to stop the engine.

6. The combination with an engine-driven shaft of a propeller comprising blades rotatable for pitch-variation, mechanism comprising a driving element fixed, and a driven element rotatable on the shaft for rotating the blades at a relatively low speed for pitch-changes, a brake engageable with the driven element for rotating the blades at a high speed to their feathered position, and engageable with the driving element to retard the shaft, means for rendering the ignition means of the engine inoperative, and means for conjointly controlling the brake to rotate the blades at high speed to their feathered position and the means for rendering the ignition means inoperative to stop the engine.

7. In a controllable pitch propeller, the combination of variable pitch blades, mechanism for rotating the blades for pitch variation, comprising a friction driving element fixed to rotate with the propeller and a driven element adapted to rotate the blades for pitch variation, said elements being provided with confronting sidefaces, an idler pulley engaging both of said elements and for operating the driven element to increase and decrease the pitch at low speeds and brake-means engageable with the driven element to operate said element to shift the blades into their feathered position at a higher speed than they are driven by the pulley.

8. In a controllable pitch propeller, the combination with an engine-driven shaft, of variable pitch blades, mechanism for rotating the blades for pitch variation comprising a driving element fixed to rotate with said shaft, a driven element rotatable on said shaft, means for operating the driven element from the driving element at varying speeds and for rotating the blades for increasing and decreasing the pitch at a relatively low speed, and means for rotating the driven element at a higher speed than said driven element is operable by the variable speed operating means and the driving element, for quickly shifting the blades to their feathered position.

9. In a controllable pitch propeller, the combination with an engine-driven shaft, of variable pitch blades, mechanism for rotating the blade for pitch variation comprising a driving element fixed to rotate with said shaft, a driven element rotatable on said shaft, means for operating the driven element from the driving element at varying speeds and for rotating the blades for increasing and decreasing the pitch at a relatively low speed, and a brake for rotating the driven element at a higher speed than said driven element is operable by the variable speed operating means and the driving element, for quickly shifting the blades to their feathered position.

10. In a controllable pitch propeller, the combination with an engine-driven shaft, of variable pitch blades, mechanism for rotating the blades for pitch variation comprising a friction driving element fixed to rotate with said shaft, a friction driven element rotatable on said shaft, friction means for operating the driven element from the driving element at varying speeds and for rotating the blades for increasing and decreasing the pitch at a relatively low speed, and a brake for engaging the driven element and rotating it at a higher speed than said driven element is operable by the variable speed operating means and the driving element, for quickly shifting the blades to their feathered position.

GLEN T. LAMPTON.